United States Patent [19]
Miyata

[11] Patent Number: 5,757,373
[45] Date of Patent: May 26, 1998

[54] INFORMATION PROCESSING APPARATUS WITH DISPLAY FOR A VARIABLE NUMBER OF FUNCTIONAL ITEMS

[75] Inventor: Masanori Miyata, Mitaka, Japan

[73] Assignee: Canon Kabushiki Kaisha, Japan

[21] Appl. No.: 407,396

[22] Filed: Mar. 17, 1995

Related U.S. Application Data

[63] Continuation of Ser. No. 123,989, Sep. 21, 1993, which is a continuation of Ser. No. 804,066, Dec. 9, 1991, which is a division of Ser. No. 725,239, Jun. 27, 1991, Pat. No. 5,105,285, which is a continuation of Ser. No. 296,864, Jan. 13, 1989, which is a continuation of Ser. No. 908,884, Sep. 15, 1986, which is a continuation of Ser. No. 475,382, Mar. 14, 1983.

[30] Foreign Application Priority Data

| Mar. 19, 1982 | [JP] | Japan | 42530/1982 |
| Mar. 19, 1982 | [JP] | Japan | 42531/1982 |
| Mar. 19, 1982 | [JP] | Japan | 42534/1982 |
| Mar. 19, 1982 | [JP] | Japan | 42535/1982 |

[51] Int. Cl.⁶ .................................................. G06F 13/00
[52] U.S. Cl. .................. 345/353; 345/340; 345/346; 345/352; 345/902; 358/447; 358/448
[58] Field of Search ............................. 345/204, 902, 345/903, 904, 905, 55, 352, 353, 356, 357, 340, 341–47, 348; 358/400, 404, 434, 450, 452, 453, 468

[56] References Cited

U.S. PATENT DOCUMENTS

| 2,356,116 | 9/1944 | Ridings | 358/439 |
| 3,679,875 | 7/1972 | Rawson et al. | 235/61.7 R |
| 3,757,037 | 9/1973 | Bialek | 345/168 |
| 3,824,334 | 7/1974 | Jacobson et al. | 358/439 |
| 4,007,362 | 2/1977 | Sindermann | 358/452 |
| 4,028,692 | 6/1977 | Ngo | 345/87 |
| 4,202,041 | 5/1980 | Kaplow et al. | 364/900 |
| 4,332,464 | 6/1982 | Bartulis et al. | 345/173 |
| 4,374,381 | 2/1983 | Ng et al. | 345/173 |
| 4,396,977 | 8/1983 | Slater et al. | 345/146 |
| 4,425,627 | 1/1984 | Eibner | 395/156 |
| 4,431,870 | 2/1984 | May et al. | 345/173 |
| 4,434,475 | 2/1984 | McCaskill et al. | 364/900 |
| 4,451,895 | 5/1984 | Sliwkowski | 395/155 |
| 4,458,331 | 7/1984 | Amezcua et al. | 364/900 |
| 4,481,603 | 11/1984 | McCaskill et al. | 364/900 |
| 4,498,142 | 2/1985 | Advani et al. | 364/900 |
| 4,506,343 | 3/1985 | Shipp, Jr. et al. | 364/900 |
| 4,533,910 | 8/1985 | Sukonick et al. | 340/721 |
| 5,105,285 | 4/1992 | Miyata | 358/449 |

FOREIGN PATENT DOCUMENTS

| 0149746 | 12/1978 | Japan | 379/100 |
| 0088527 | 7/1981 | Japan | 340/711 |
| 2078465 | 1/1982 | United Kingdom | 379/100 |

*Primary Examiner*—Edward L. Coles
*Assistant Examiner*—Madeline Anh-Vinh Nguyen
*Attorney, Agent, or Firm*—Fitzpatrick, Cella, Harper & Scinto

[57] ABSTRACT

An image transmission system includes an image transmitting unit having a display to display a status of a receiving unit and a detector for detecting a size of an original and a record mode permitted for transmission. A variable number of items of functional information together with a message that explains an operation of the system can be displayed, and respective input positions are provided for requesting the input of the functional information for the items. The number of items displayed then depends on the number of input positions operated.

9 Claims, 15 Drawing Sheets

FIG.10A

| HORIZONTAL PARITY |
| --- |
| ETX |
| VACANT DATA |
| COMMAND |
| SOURCE ADDRESS |
| DESTINATION ADDRESS |
| STX |

FIG.10B

| HORIZONTAL PARITY |
| --- |
| ETX |
| STATUS INFORMATION |
| COMMAND STATUS |
| SOURCE ADDRESS |
| DESTINATION ADDRESS |
| STX |

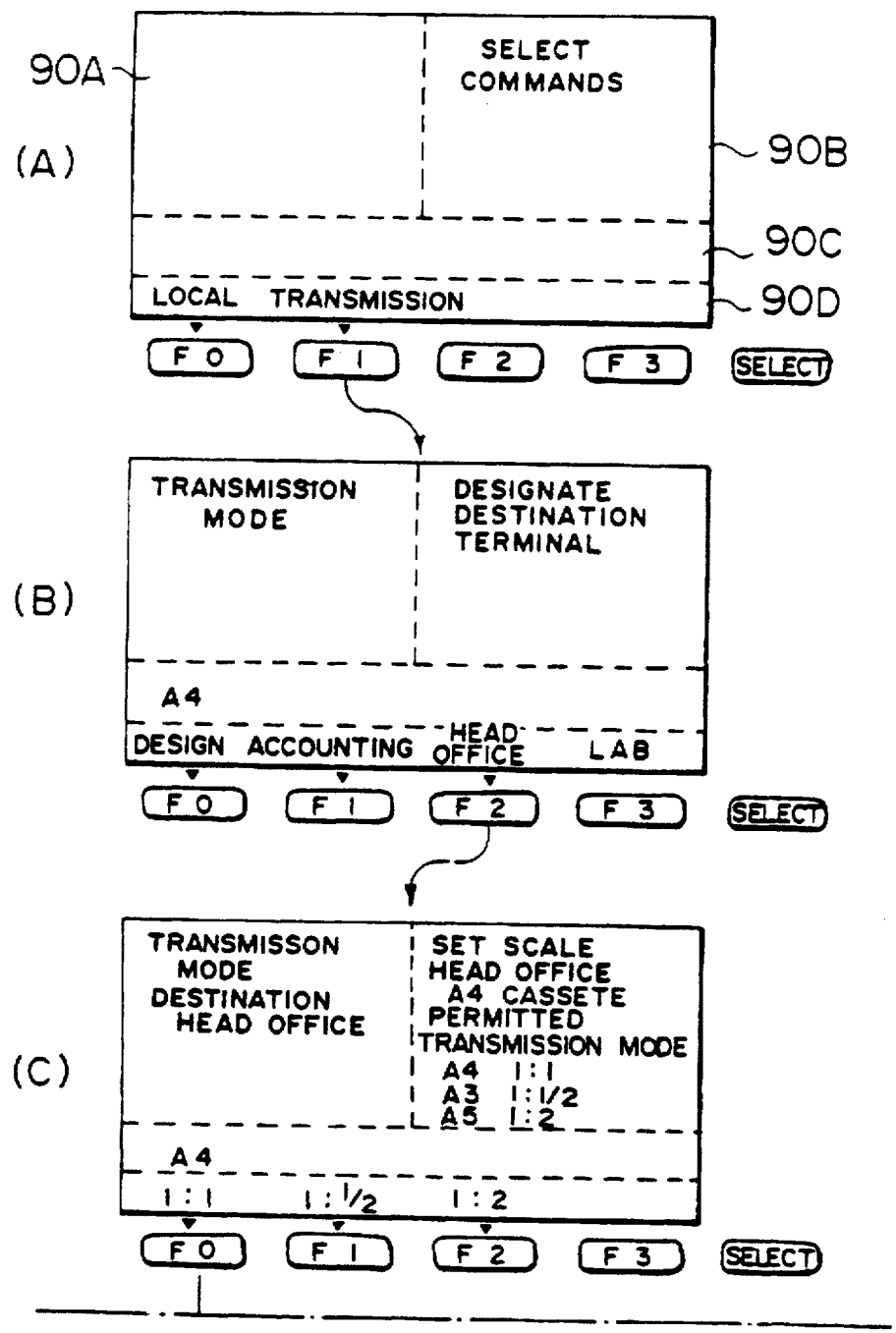
FIG. IIA

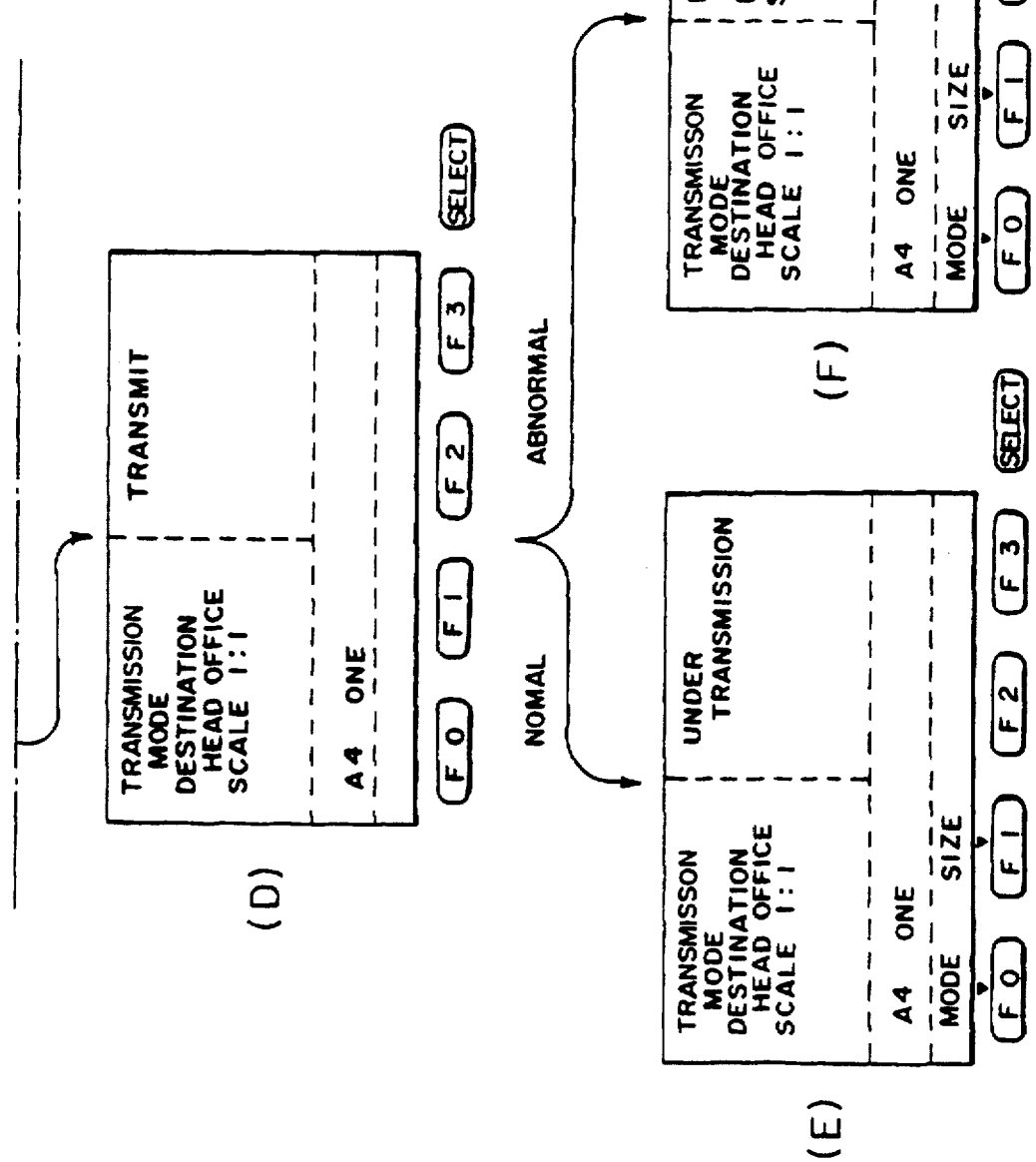

INFORMATION PROCESSING APPARATUS WITH DISPLAY FOR A VARIABLE NUMBER OF FUNCTIONAL ITEMS

This application is a continuation of application Ser. No. 08/123,989 filed on Sept. 21, 1993, which is a continuation of application Ser. No. 07/804,066 filed on Dec. 9, 1991, which is a divisional of application Ser. No. 07/725,239 filed on Jun. 27, 1991, which is a continuation application of Ser. No. 07/296,864 filed on Jan. 13, 1989, which is a continuation application of Ser. No. 06/908,884 filed on Sep. 15, 1986, which is a continuation application of Ser. No. 06/475,382 filed on Mar. 14, 1983.

BACKGROUND OF THE INVENTION

1. Field of the Invention

The present invention relates to an image transmission/processing system for transmitting image information or copying an image.

2. Description of the Prior Art

An image transmission system exchanges desired image information between distant locations. Image information such as a design drawing is read by a read unit in a transmitting station and the image information is reproduced and recorded by a record unit in a receiving station. In such a prior art image transmission system, proper image transmission has not been attained because a size of record papers loaded in the receiving station is unknown. A system which enlarges or reduces an image read in the transmitting station in accordance with a size of record papers in the receiving station has been known. However, if only the record papers of a size B5 are loaded in the receiving station and a sender transmits a design drawing of a size B4, it is reduced to the size B5 without regard to the intension of the sender.

If a paper cassette loaded in the receiving station is of fixed size and a sender at the transmitting station specifies a magnification factor, the image is partially cut away or blank area is produced, and the record papers are wasted.

When the imgae information is transmitted to the receiving station, particularly to an automatic receiving station, the status of the receiving station recording unit, for example, lack of toner, lack of record papers or jam of papers cannot be exactly known at the transmitting station but only an error condition of the receiving station recording unit is known. Accordingly, subsequent processing is not properly effected and a sender retransmits the image information after the error indication is released.

A recent system has a number of junctions and keying operations for the respective functions are comple. Accordingly, contents of display are large in volume and the number of parts is large and hence misoperation tends to increase.

SUMMARY OF THE INVENTION

It is an object of the present invention to provide an image transmission system including one or more image transmission units having means for displaying a status of a receiving station.

It is another object of the present invention to provide an image transmission system having means for detecting a status of a receiving station.

It is other object of the present invention to provide an image transmission system having means for detecting a size of original permitted for transmission.

It is other object of the present invention to provide an image transmission system having means for detecting a record mode permitted for transmission.

It is other object of the present invention to provide an image transmission system having means for displaying an alarm when a size of original or a record mode permitted for transmission is not detected.

It is other object of the present invention to provide an image transmission system having key means for selecting a transmission mode.

It is other object of the present invention to provide an image transmission system having means for displaying permission of copying or transmission after all information to be set have been entered.

It is other object of the present invention to provide an image transmission system having means for displaying functions on a plurality of display areas, and function designating means corresponding to the display areas for executing the corresponding functions.

It is other object of the present invention to provide an image processing apparatus having improved keys and display.

The above and other objects of the present invention will be apparent from the following description of the preferred embodiments.

BRIEF DESCRIPTION OF THE DRAWINGS

FIG. 10A shows an example of a command packet.

FIG. 10B shows an example of a status packet.

FIG. 11 shows an arrangement of FIG. 11A and FIG. 11B.

FIGS. 11A(*a*)–11B(*f*) show function display areas of the control display and the keys.

DETAILED DESCRIPTION OF THE PREFERRED EMBODIMENTS

The image transmission system exchanges desired image information between distant locations. Image information such as design drawing to be transmitted is read by a reading circuit in a transmission station and the image information is reproduced and recorded by a recording unit in a receiving station.

Figure 1:
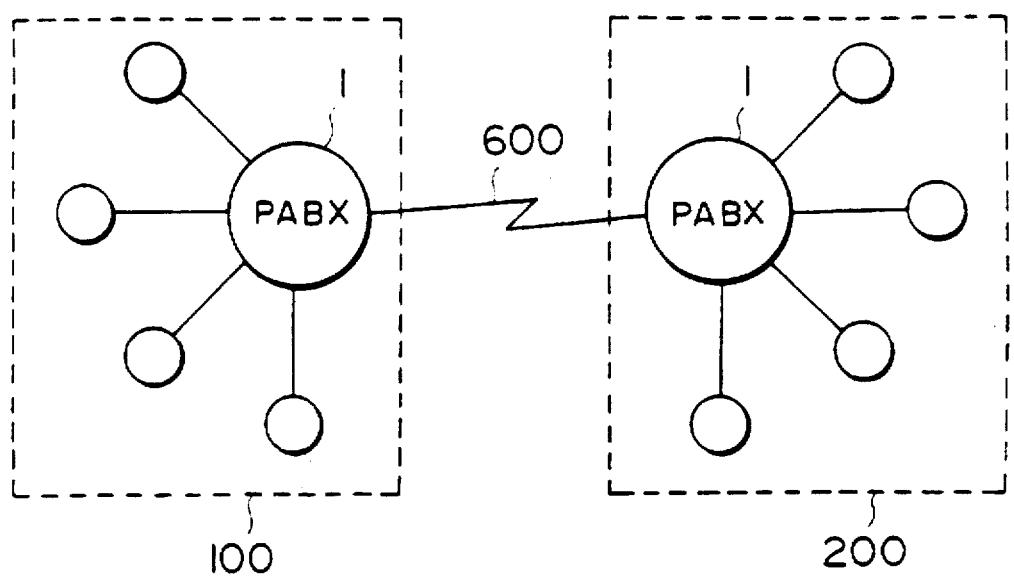
FIG. 1 shows a conceptual diagram of a network of an image transmission system of the present invention.

FIG. 1 shows a concept of a network of the image transmission system of the present invention. Numeral 1 denotes a private automatic branch exchange (PABX), and private networks 100 and 200 are interconnected by a public line 600.

Figure 2:
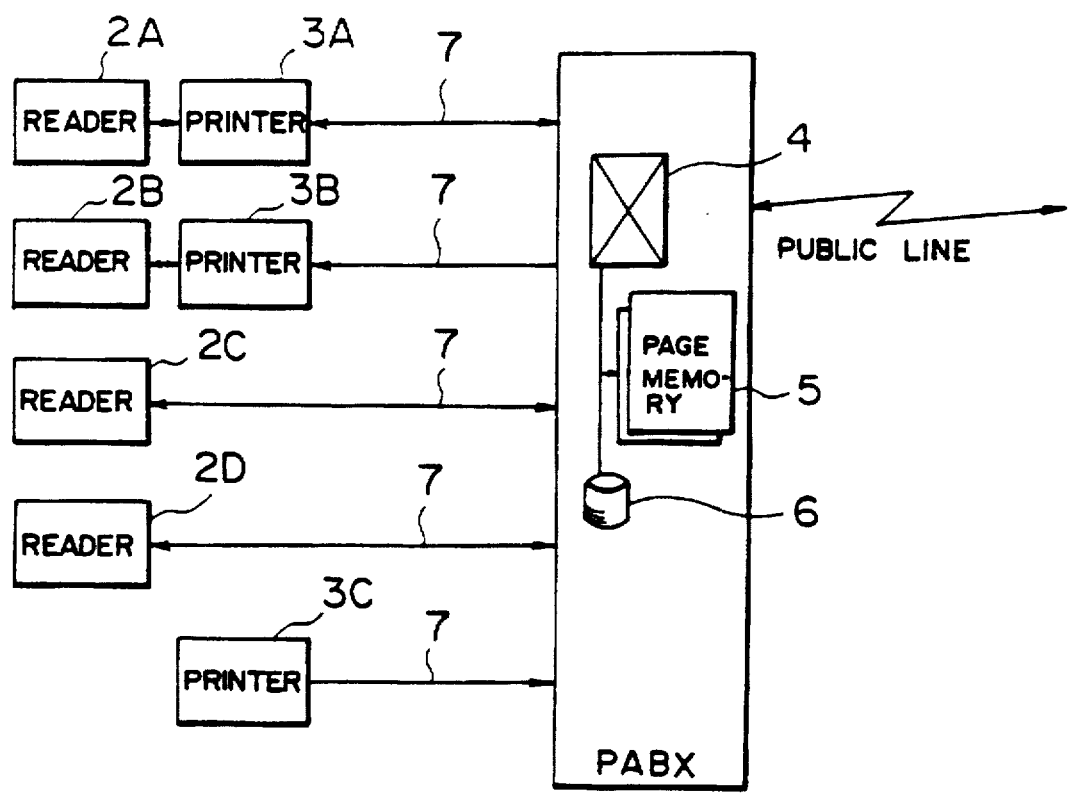
FIG. 2 shows a block diagram of a private network.

FIG. 2 shows an embodiment of the image transmission system of the present invention. Numerals 2A–2D denote readers and numerals 3A–3C denote printers. The printers 3 are connected to the PABX 1 through optical fibers 7 to form a network. The PABX1 includes a switch board 4 for selectively connecting inputs and outputs, a page memory 5 such as a semiconductor RAM for storing several pages of image information and an auxiliary disc memory 6 capable of storing a number of pages of image information.

Figure 3:
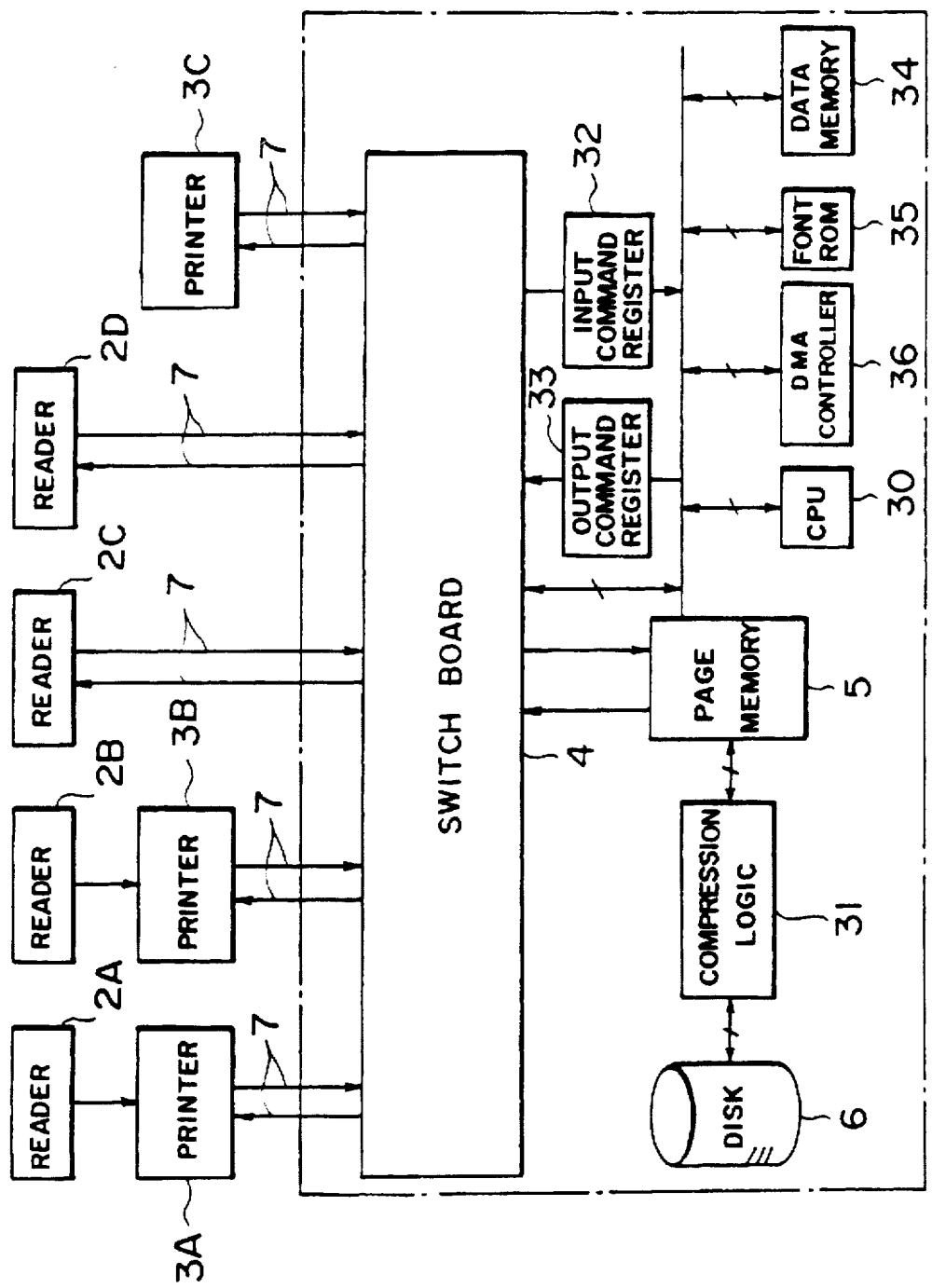
FIG. 3 shows a detailed block diagram of a private automatic branch exchanger.

FIG. 3 shows a detail of the PABX 1. The input/output signals from the readers 2 and the printers 3 are supplied to and from the switch board 4 through the signal lines 7 such as the optical fibers, and they are selectively supplied to the page memory 5 by a CPU 30, and if a destination station is busy or a transmission/reception request is issued from other terminal device, the input/output signals are stored in the disc memory 6 through a compression logic 31. The image data are filed with indexes attached at beginnings of the data. Each of the indexes includes a file number, a source address and a destination address. If the destination station is free, the switch board 4 can bypass the page memory 5 and directly transmit to the destination station on real time basis. Numeral 32 denotes an input command register and numeral 33 denotes an output command register. They store command packets including various commands. Numeral 34 denotes a data memory, numeral 35 denotes a font ROM and numeral 36 denotes a DMA (direct memory access) controller.

Figure 4:
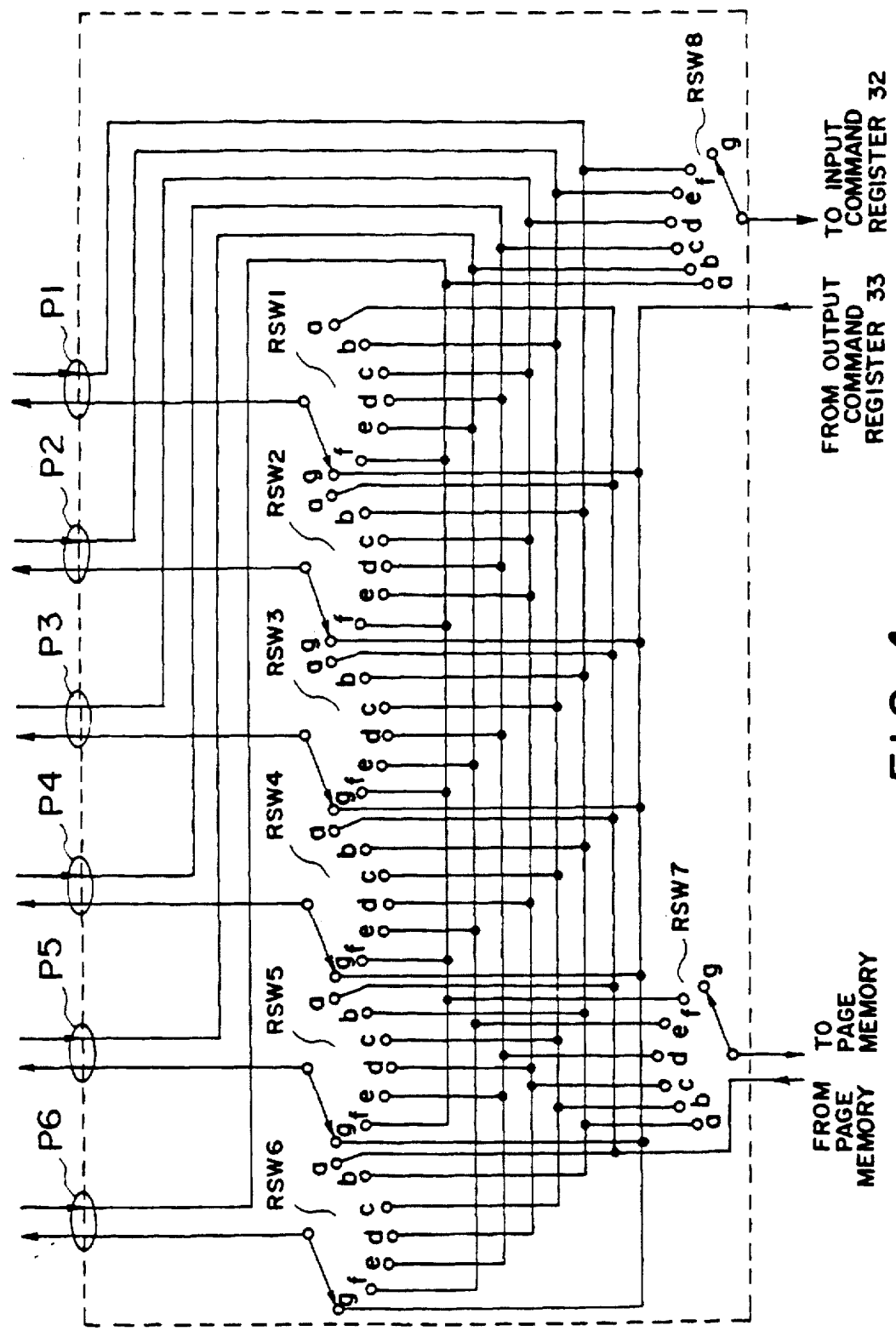
FIG. 4 shows a wiring diagram of an exchanger.

FIG. 4 shows a detail of the switch board 4. Arranged on the switch board 4 are terminals P1–P6 to be connected to the readers 2 and the printers 3 and rotary switches RSW 1–RSW 6 paired with the corresponding terminals P1–P6. A rotary switch RSW 7 which is paired with the page memory 5 and a rotary switch RSW 8 which is paired with the input command register 2 are also arranged. Each of the rotary swithes RSW receives input signals from the terminals other than the terminal of its own. For example, terminals a–g of the rotary switch RSW 1 receive the input signals from the terminals P2–P6 and the page memory 5. The contacts of those rotary switches RSW are selectively connected by an instruction from the CPU 30.

For example, when the terminal P1 is connected to the reader 2 and the terminals P3 and P4 are connected to the printers 3 and it is desired to transmit the information from the reader 2 to the two printers 3 connected to the terminals P3–P4 but the terminal P4 is busy, the information may be transmitted to the printer 3 connected to the terminal P3 on a real time basis and the information may be temporarily stored is the disc 6 through the page memory 5 and it may be transmitted to the terminal P4 after the busy status has been released. To this end, the contact b of the rotary switch RSW 3 and the contact a of the rotary switch RSW 7 are selected by the CPU 30 and the signal from the reader 2 connected to the terminal P1 is transmitted to the printer 3 connected to the terminal P3 and it is also transmitted to the page memory 5. After the busy status of the printer 3 connected to the terminal P4 has been released, the contact a of the rotary switch RSW 4 is selected and the signal is transmitted from the disc 6 to the printer 3 connected to the terminal P4, through the page memory 5.

Figure 5:
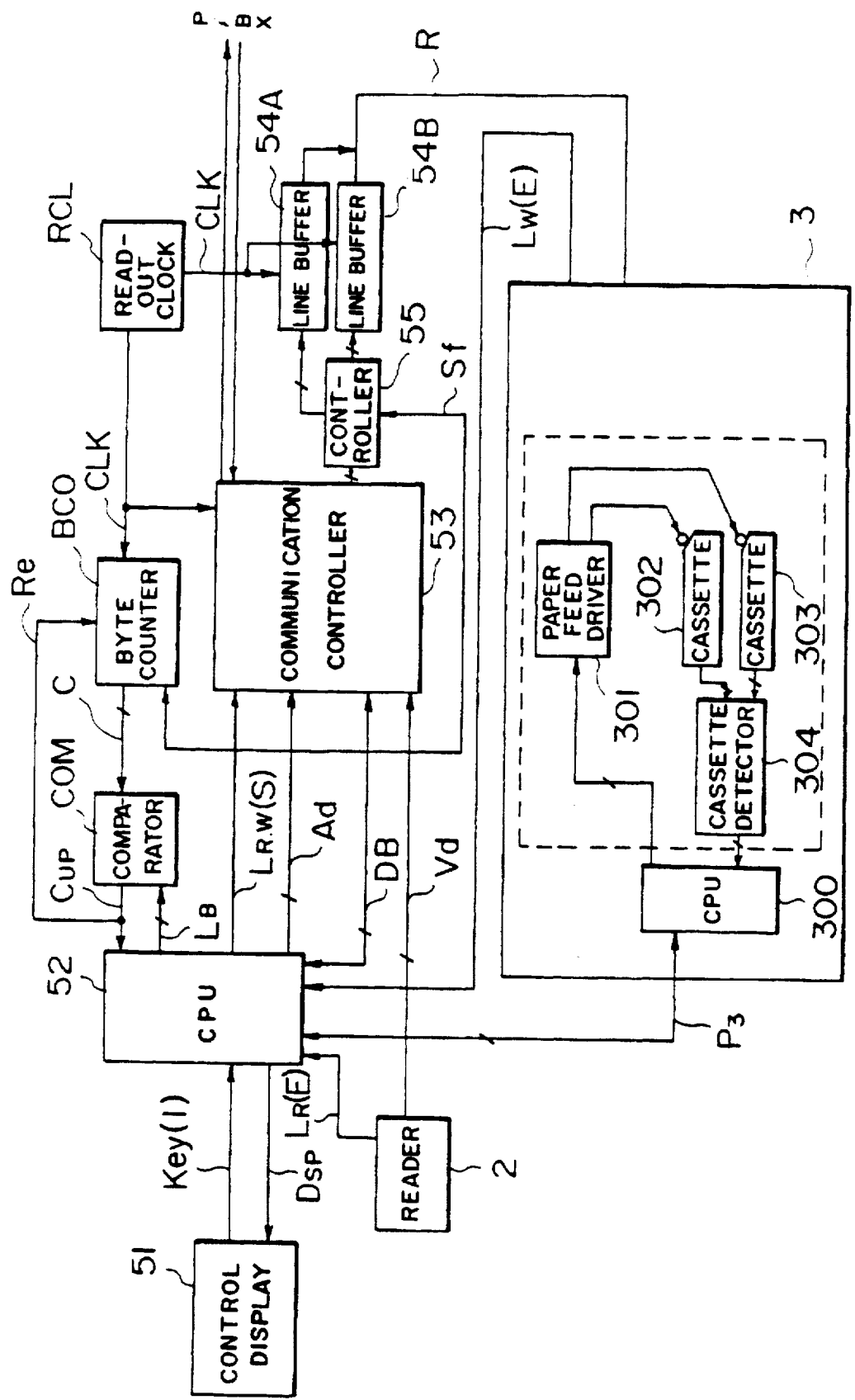
FIG. 5 shows a block diagram which primarily shows a control display and a control unit of the image transmission system of the present system.

FIG. 5 shows an embodiment of the reader, the printer, the controller and the control display in the transmitting station. Numeral 2 denotes the reader which is shown in detail in FIG. 6. Numeral 3 denotes the printer (record unit) in which numeral 300 denotes a central processing unit (CPU) for controlling various elements of the record unit 3, numeral 301 denotes a paper feed driver, numerals 302 and 303 denote cassettes which contain record papers of different sizes from each other, and numeral 304 denotes a known cassette detector. The paper feed driver 301 feeds a record paper from one of the cassettes 302 and 303 under the control of the CPU 300 based on a signal detected by the cassette detector 304. FIG. 7 shows a further detail of the record unit 3. Numeral 51 in FIG. 5 denotes a control display which is shown in detail in FIG. 8.

Numeral 52 denotes a CPU which controls various units of the image transmission system, and numeral 53 denotes a communication controller which controls the transmission and reception of the image information between the readers 2 and the record units 3 through the PABX 1. Numerals 54A and 54B denote line buffers to which the video signals Vd from the readers 2 are supplied through the communication controller 53 and the controller 55, and output data R therefrom are supplied to the record units 3. Key (I) denotes a key signal from a key operated in the control display, DSP denotes a display signal supplied from the CPU 52 to the control display 51, $L_R(E)$ denotes a reader enable signal supplied from the reader 2 to the CPU 52, Lw(E) denotes a printer enable signal supplied from the record unit 3 to the CPU 52, Ps denotes a printer status signal which indicates a status of the record unit 3, and DB denotes a data bus between the communication controller and the CPU. The communication command packet is read and written through the data bus DB in accordance with an address signal Ad. RCL denotes a readout clock generator, BCO denotes a byte counter and COM denotes a comparator.

Figure 6:
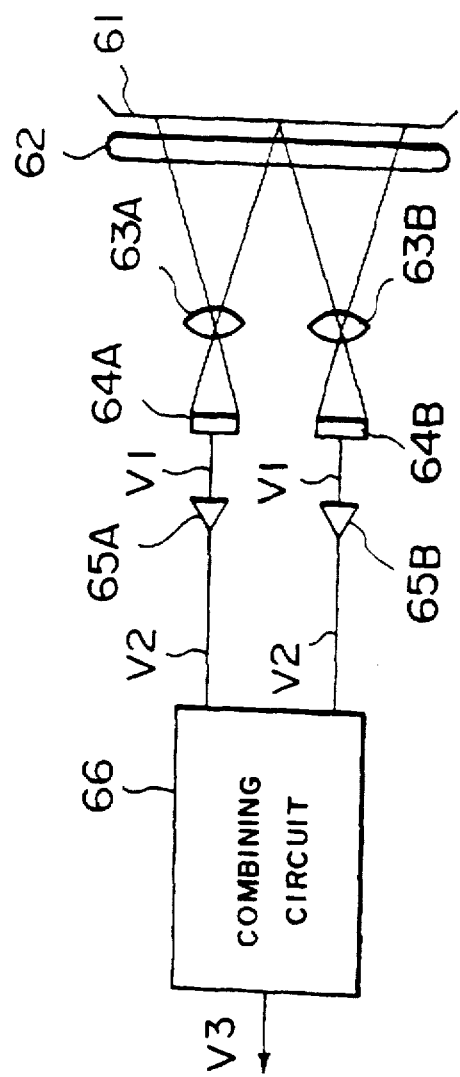
FIG. 6 shows a detailed block diagram of a read unit.
Figure 7:
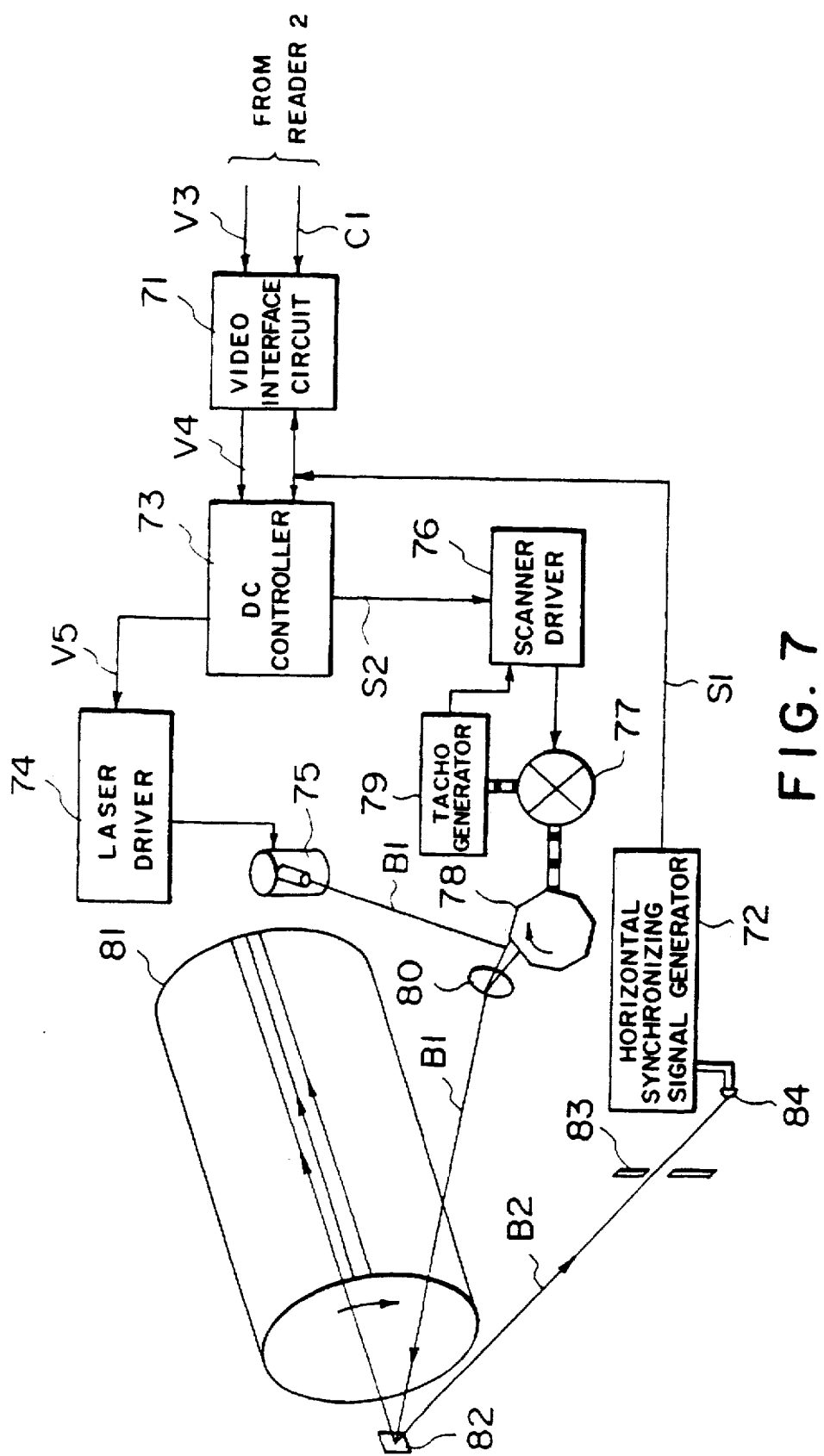
FIG. 7 shows a detailed block diagram of a record unit.

FIG. 6 shows an embodiment of the reader 2 of the image transmission system of the present invention. Numeral 61 denotes an original, numeral 62 denotes a bar light source such as a fluorescent lamp, numerals 63A and 63B denote lenses, numerals 64A and 64B denote one-dimensional solid-state imaging devices such as (CCD), numerals 65A and 65B denote amplifiers and numeral 66 denotes a combining circuit.

The operation of the reader 2 is now explained. The original 61 to be copied is illuminated by the bar light source 62 and the image of the original is focused onto the CCD 64A and 64B by the lenses 63A and 63B through a mirror, not shown, which scans the original 61. The photo-electrically converted video information V1 from the CCD 64A and 64B are supplied to the amplifiers 65A and 65B where they are shaped and then they are supplied to the combining circuit 66. The combining circuit 66 combines the video information V2 supplied from the amplifiers 65A and 65B and converts the video information V2 to one video information V3 in a manner as if they were image-processed by one CCD and supplies the video information V3 to the printer 3.

FIG. 7 shows one embodiment of the printer 3 of the image transmission system of the present invention. Numeral 71 denotes a video interface circuit (synchronizing circuit) which synchronizes the video signal V3 supplied from the combining circuit 66 of the reader 2 of FIG. 6 together with a clock signal C1 with a horizontal synchronizing signal (beam detect pulse) S1 supplied from a horizontal synchronizing signal generator 72 of the printer 3 to produce a video signal V4, which is then supplied to a DC controller 73 to synchronize the read timing of the CCD 64A and 64B with the video signal V4 to the printer 3. The horizontal sychronizing signal generator 72 supplies the horizontal synchronizing signal S1 to the video interface circuit 71 and the DC controller 73. The DC controller 73 responds to the video signal V4 and horizontal synchronizing signal S1 supplied thereto to supply a video signal V5 to a laser driver 74 to turn on and off a semiconductor laser 75 to modulate a laser beam B1, and supplies a scanner drive signal S2 to a scanner driver 76 to rotate a polygon mirror 78 at a predetermined speed through a scanner motor 77. Numeral 79 denotes a tachogenerator for controlling the rotation. It detects a rotation speed of the scanner motor 77 and supplies a detect signal to the scanner driver 76. The polygon mirror 78 scans the laser beam B1 emitted from the semiconductor laser 75. Numeral 80 denotes an Fθ lens which corrects a scanning speed of the laser beam B1 at a periphery and a center of a photosensitive drum 81. Numeral 82 denotes a mirror, numeral 83 denotes a slit and numeral 84 denotes a photo-diode. A signal detected by the photo-diode 84 is supplied to the horizontal synchronizing signal generator 72.

The printer 3 is a laser beam printer which forms an image by the laser beam. The operation thereof is now explained. The video signal V3 and the clock signal C1 supplied from the reader 2 of FIG. 6 and the horizontal synchronizing signal generator 72 of the printer 3 are supplied to the video interface circuit 71 to the DC controller 73. The DC controller 73 responds to the video signal V4 and the horizontal synchronizing signal S1 to supply the video signal V5 to the laser driver 14 and supply the scanner driver signal S2 to the scanner driver 76. The laser driver 74 turns on and off the semiconductor laser 75 in accordance with the video signal V5 to modulate the laser beam B1. The scanner driver 76 controls the rotation of the polygon mirror 78 in accordance with the scanner driver signal S2. The laser beam B1 emitted from the semiconductor laser 75 is scanned by the rotating polygon mirror 78 so that a recording image is written on the photosensitive drum 81 through the correction Fθ lens 80. A laser beam B2 reflected by the mirror 82 is sensed by the photodiode 84 through the slit 83 to produce the horizontal synchronizing signal S1 in the horizontal synchronizing signal generator 72 in order to detect the start of scan of the laser beam B1. As described above, the signal S1 is supplied to the DC controller 73 and the video interface circuit 71 to use it as the output timing for the video signal V4.

Figure 8:
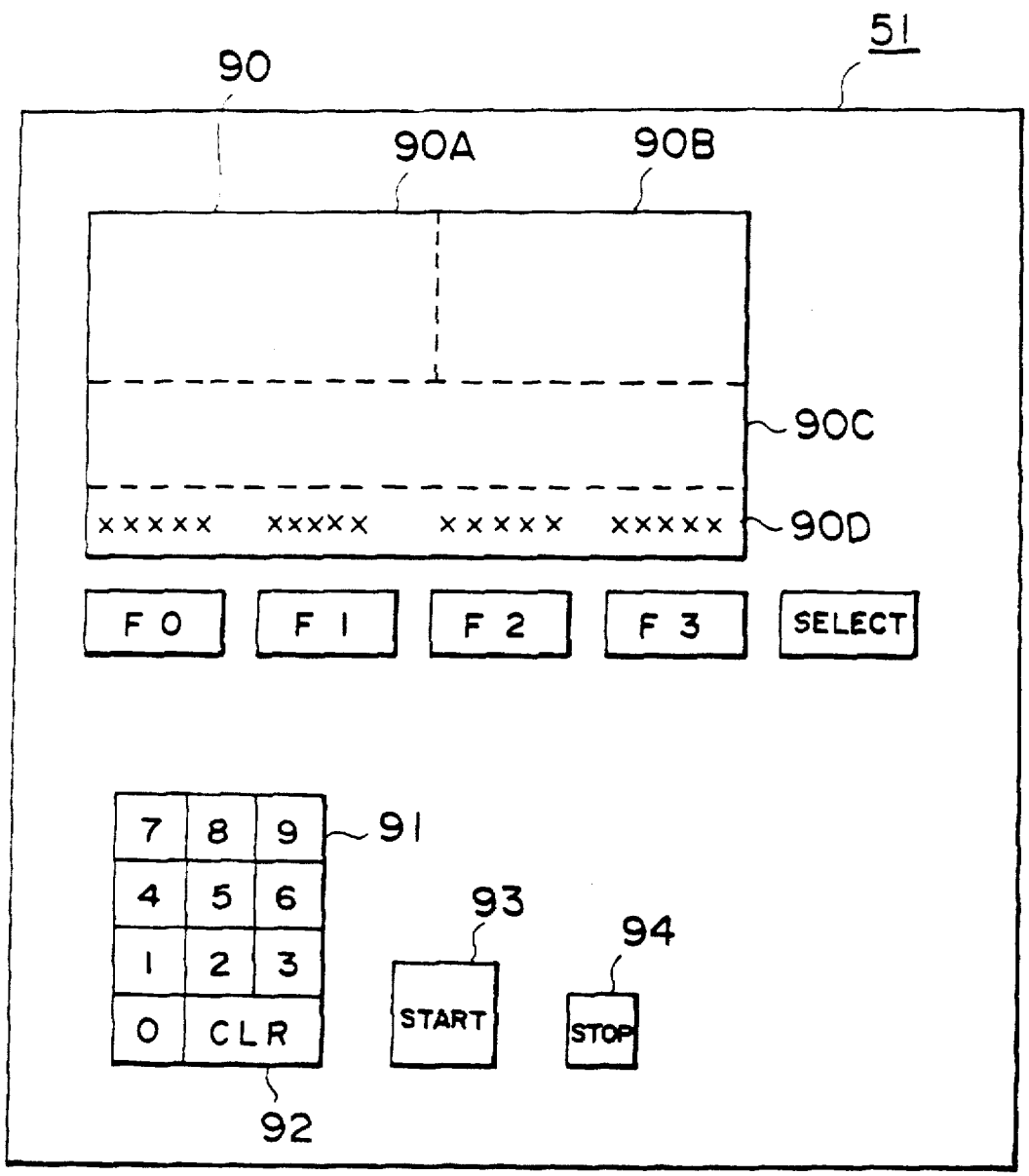
FIG. 8 shows a detailed diagram of the control display.

FIG. 8 shows an embodiment of the control display. Numeral 90 denotes a display screen of a display 51, which is a liquid crystal dot matrix graphic display in the present embodiment. The display screen 90 is sectioned into four areas, a command display area 90A, a status display area 90B, a counter display area 90C and a function display area 90D. Function keys F0, F1, F2, F3 and SELECT are arranged under the function display area 90D so that the content of the display in the function display area 90D, for example, a function of "local copy" or "transmission" is selected by the function key under the display. If a desired function is not on the display, the select key SELECT is depressed and the content of the display in the function display area 90D is changed. Numeral 91 denotes a ten-key, numeral 92 denotes a clear key, numeral 93 denotes a start of copy/transmission key, and numeral 94 denotes a stop key. A command related to an operation to be done next by an operator is displayed in the command display area 90A, a record mode such as a size of record papers loaded in the destination terminal device, a size of original permitted for transmission or a magnification factor of the record is displayed in the status display area 90B, and the number of copies is displayed on the counter display area 90C.

Figure 9:
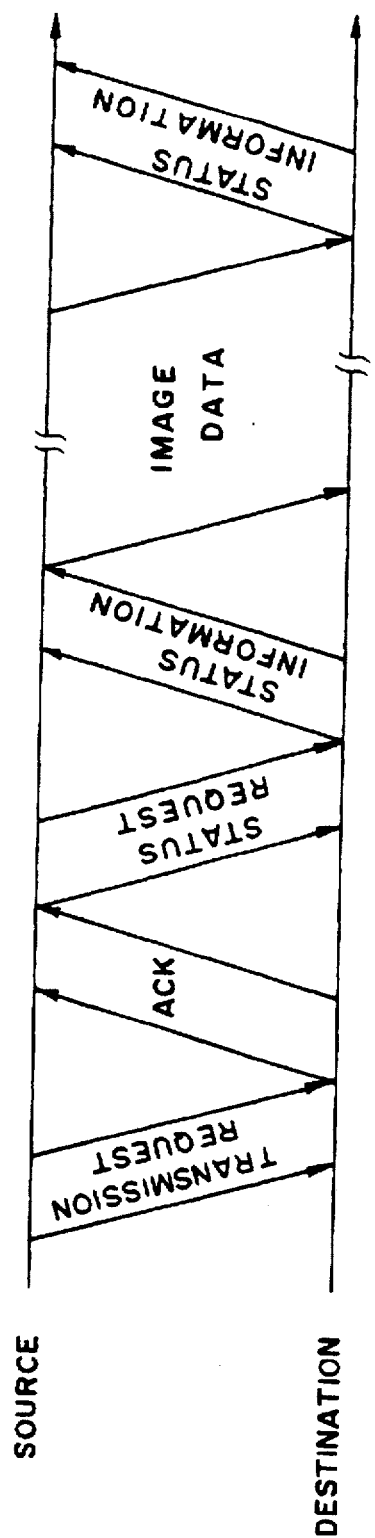
FIG. 9 shows transmission procedures.

FIG. 9 illustrates a communication protocol a transmission request is sent to a desired receiving station designated by the transmitting station by a command packet shown in FIG. 10A. The command packet may be a multi-word signal with each word consisting of eight bits, and comprises an STX (start of text), a destination address, a source address, a command, an ETX (end of text) and a horizontal parity.

When the receiving station receives the transmission request, it sends an ACK (acknowledgy) signal to the transmitting station. Then, the transmitting station sends a status signal to detect a status of the receiving station such as lack of toner, lack of record papers, jam, copying operation busy, line busy and non-connection. When the receiving station receives the status request, it sends the status of the receiving station to the transmitting station by a status packet shown in FIG. 10B.

The status packet comprises an STX, a destination address, a source address, a command status, a status information, an ETX and a horizontal parity.

Then, the image information in the transmitting station is sent to the destination station through the switch board 4. When the receiving station is busy, the image information is temporarily stored in the disc 6 of the switch board 4 and a status information indicating that the image information is stored in the file is displayed on the control display 51. As soon as the receiving line becomes available, the data in the disc is transmitted. The non-connection indicates that a communication link between the transmitting station and the receiving station has not been established. After the image data has been transmitted, the receiving station again sends a status information to the transmitting station and the status information is displayed on the control display 51. The status information may include lack of toner, lack of record papers, copy busy, line busy, jam and non-connection.

The operation of the image transmission system thus constructed is now described with reference to FIGS. 11 and 12.

Figure 12C:
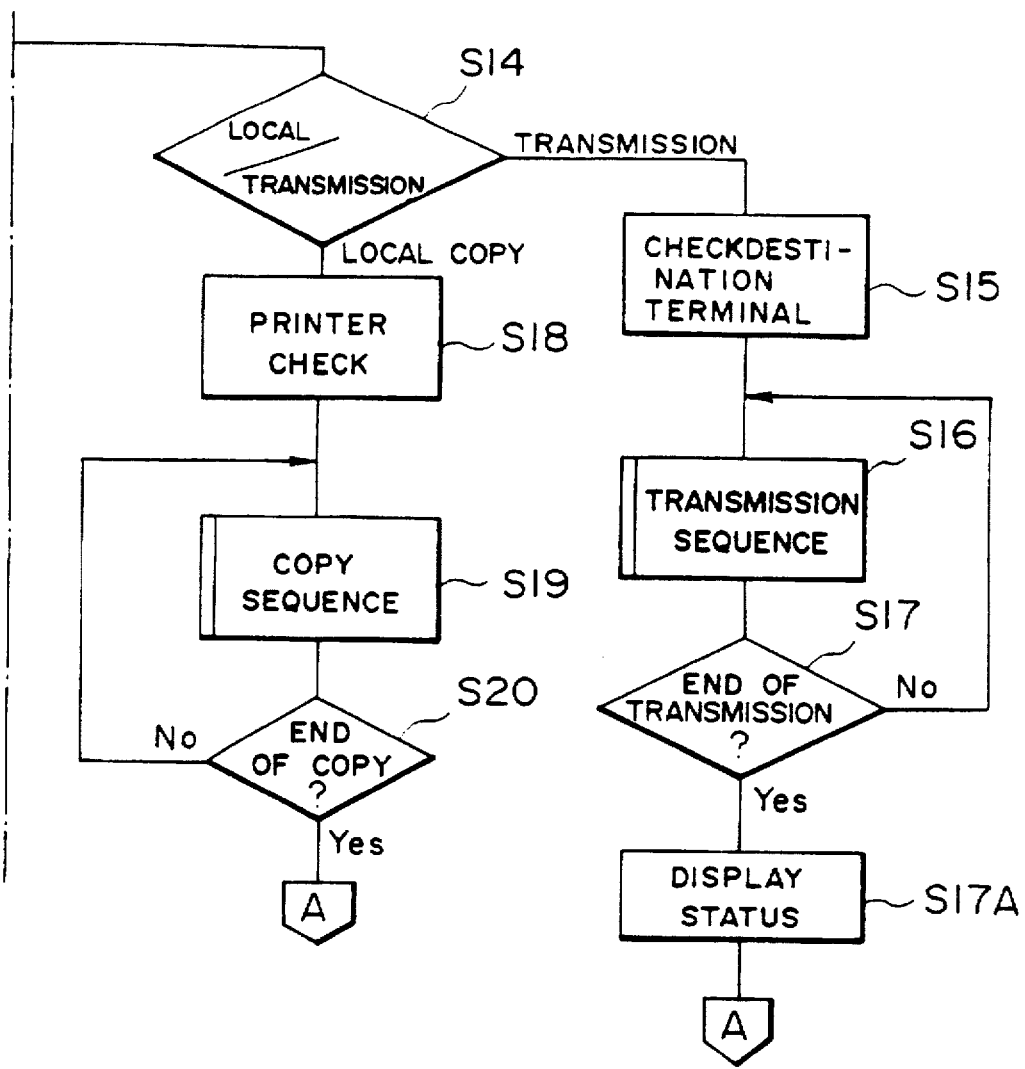
FIG. 12, consisting of FIGS. 12A–12C, shows a flow chart of sequences of the image transmission system of the present invention.
Figure 12:
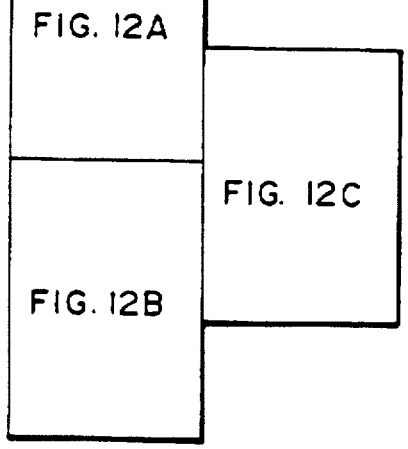
Figure 12A:
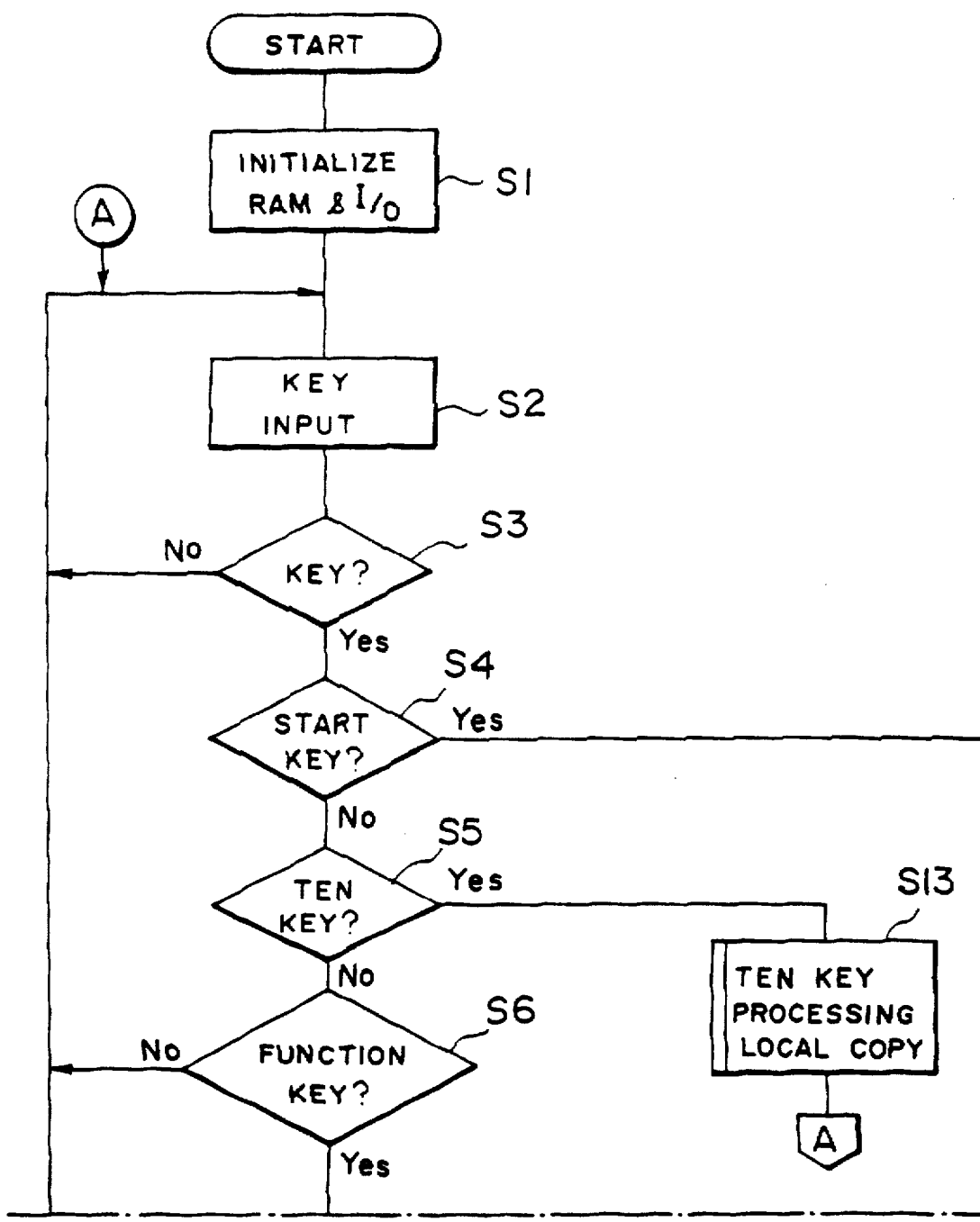
Figure 12B:
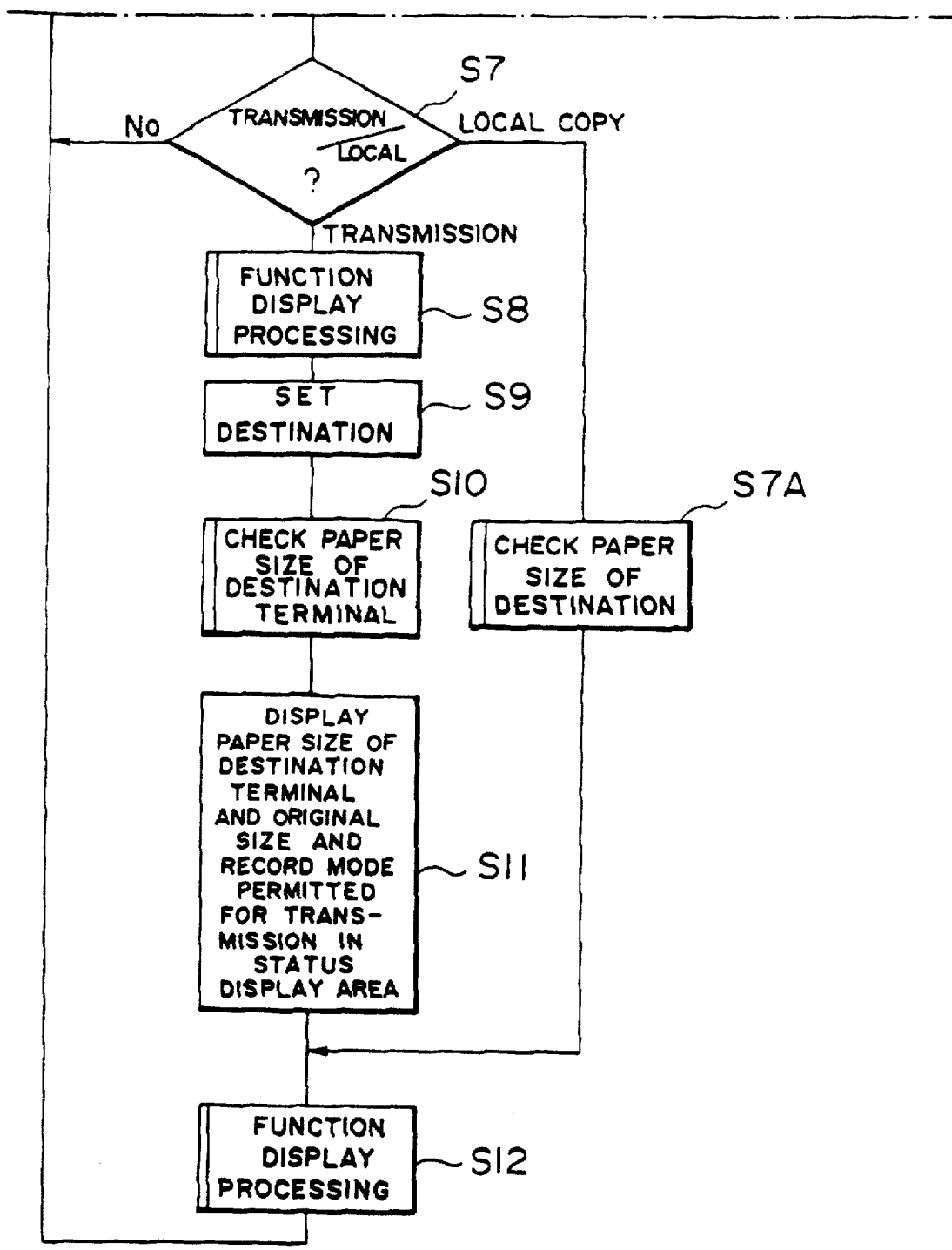

When a power is turned on, the RAM and the I/O devices are initialized in a step S1 of FIG. 12. Then, as shown in FIG. 11A(a), the "transmission" mode displayed in the function display area 90D is selected by depressing the function key F1 (step S2). After steps S3, S4, S5 and S6, it is checked in a step S7 if a local copy mode (that is, copying operation by the printer which is in union with the reader, a transmission mode or other function key has been selected. Since the "transmission" mode has been selected in the illustrated example, function display processing is carried out in a step S8 so that a destination station is displayed in the function display area 90D as shown in FIG. 11A(b). If "head office" is designated as the destination station in a step S9, a size of record papers loaded in the destination station is checked in a step S10, and in a step S11 the size of record papers, a size of original permitted for transmission and a record mode permitted, that is, equi-scale, magnified scale or reduced scale are determined and they are displayed in the status display area 90B. If record papers of a size A4 are loaded in the receiving station, "record papers of receiving station size A4, size of original and record mode permitted for transmission size A4, equi-scale, size A3, ½ scale; size A5, double scale" is displayed in the status display area 90B as shown in FIG. 11A(c). In a step S12, function display processing is carried out so that the record mode (equi-scale in the present example) is displayed as shown in FIG. 11A(c). If the operator wants to send the original of the size A4 at the equi-scale, the operator depresses the function key F0 and the process goes through the steps S2–S6 to the step S7, where "NO" decision is made and the process goes to the step S2. Then, the operator specifies the number of copies by the ten-key 91 and the process goes through the steps S2–S5 to a step S13 where ten-key processing is executed and the process goes to the step S2. At this moment, the display screen 90 displays as shown in FIG. 11B(d). After all items to be designated have been entered, the start key 93 is depressed and the process goes through the steps S2–S4 to a step S14. Since the transmission mode has been selected in the present example, the process goes to a step S15 where the status of the record unit of the destination station such as lack of toner and lack of record papers is detected. The detect information is sent back to the transmitting station, which controls the switch board 4 is accordance with the detect information. In a step S16, transmission sequence is executed, and if the status is not normal, that is, if line is busy or toner is empty, the image information is temporarily stored in the disc 6. If the status is normal, the display screen displays as shown in FIG. 11B(e) and the image information is transmitted to the receiving station on real time basis. When an end of transmission is detected in a step S17, the status such as lack of toner and lack of record papers is displayed in the display area 90B in a step 17A. If the papers are absent, the display screen displays as shown in FIG. 11B(f). "Stored in files" is displayed because the image information is stored in the disc 6.

The size of the original to be transmitted may be entered by a key by the operator or it may be optically detected by the reader.

Figure 13:
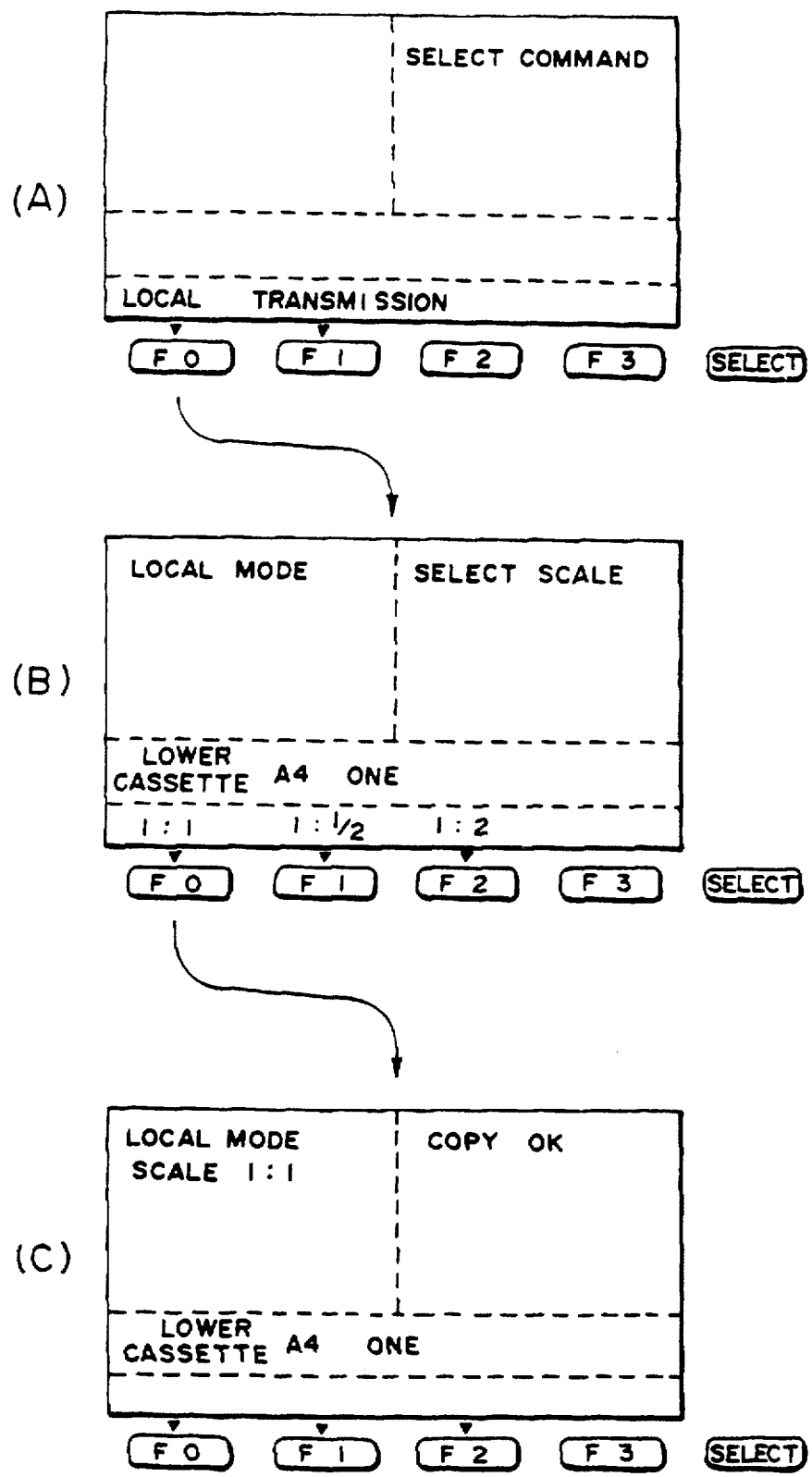
FIGS. 13A–13C show function display areas of the control display and the keys.

In the local copy mode, the process goes from the step S7 to the step S7A where a size of the record papers loaded in the record unit of its own is checked, and the process goes to the steps S12, S2 in the same sequence as the transmission mode. When the start key 93 is depressed, the process goes from the step S4 to the step S14, thence to the steps S18, S19 and S20 to execute the local copy operation. The steps and an example of the control display 51 are shown in FIGS. 13(a)–(c).

A function to record the read image information in the disc 6 can be readily added. In this case, a function "disc" is displayed in one of the display areas 21–23 and a function key under the display is depressed.

As described hereinabove, according to the present invention, usability is improved. Because the status of the receiving station is detected and displayed, the usability in the transmitting station is particularly improved.

Since the status of the receiving station is detected, it is possible to issue an alarm when the status of the receiving station does not match with the status of the transmitting station.

Since various function are displayed in the display areas on the display and the desired function can be selected by the function designating means corresponding to the display means, a simple and convenient image transmission system can be provided.

What I claim is:

1. An information processing apparatus comprising:

input means having a plurality of input positions;

display means having a plurality of display areas corresponding to the plurality of input positions respectively;

display control means for, in a case where one of the plurality of the input positions is operated when a plurality of items of functional information are displayed in the plurality of the display areas, causing said display means to erase the displayed items and to display (a) information representing the respective item that was displayed in the display area corresponding to the operated input position, (b) additional items relating to the respective item in the plurality of display areas, and (c) a message concerning the additional items, all on a same frame of said display means.

2. An apparatus according to claim 1, wherein said apparatus has a transmitting function, and the additional items indicate to which of a plurality objects the transmission is directed.

3. An apparatus according to claim 1, wherein the additional items indicate a plurality of transmission modes which are allowable according to an object to which the transmission is directed.

4. An apparatus according to claim 1, wherein the apparatus has a copying function, and the additional items indicate either a magnification or reduction ratio.

5. An apparatus according to claim 1, further comprising means for forming an image according to an electrophotographic system.

6. An information processing method comprising the steps of:

first displaying step of displaying a plurality of items of functional information in a plurality of items of functional information in a plurality of display areas;

erasing the displayed items, when one of a plurality of the input positions is operated, the plurality of the input positions being respectively provided in correspondence with the plurality of the display areas respectively; and second displaying step of displaying (a) information representing the respective item that was displayed in the display area corresponding to the operated input position, (b) additional items relating to the respective item in the plurality of the display areas, and (c) a message concerned with the additional items, all on a same frame.

7. A method according to claim 6, wherein the additional items indicate to which of a plurality of objects the transmission is directed.

8. A method according to claim 6, wherein the additional items indicate a plurality of transmission modes which are allowable according to an object to which the transmission is directed.

9. A method according to claim 6, wherein the additional items indicate either a magnification or reduction ratio.

* * * * *

UNITED STATES PATENT AND TRADEMARK OFFICE
CERTIFICATE OF CORRECTION

PATENT NO. : 5,757,373

DATED : May 26, 1998

INVENTOR(S): MASANORI MIYATA

It is certified that error appears in the above-identified patent and that said Letters Patent is hereby corrected as shown below:

COLUMN 1

Line 49, "comple." should read --complex.--.

COLUMN 6

Line 51, "station size A4," should read
       --station ... size A4,--.

Line 52, "transmission size A4," should read
       --transmission ... size A4,--.

COLUMN 7

Line 25, "S2 in the" should read --S2 ... in the--.

Line 54, "tively;" should read --tively; and--.

COLUMN 8

Line 9, "in the" should read --in a--; and
    "of" should read --of the--.

Line 14, "plurality" should read --plurality of--.

UNITED STATES PATENT AND TRADEMARK OFFICE
CERTIFICATE OF CORRECTION

PATENT NO. : 5,757,373

DATED : May 26, 1998

INVENTOR(S) : MASANORI MIYATA

It is certified that error appears in the above-identified patent and that said Letters Patent is hereby corrected as shown below:

<u>COLUMN 8</u>

Line 42, "in the" should read --in a--.

Signed and Sealed this

Twelfth Day of September, 2000

*Attest:*

Q. TODD DICKINSON

*Attesting Officer*     *Director of Patents and Trademarks*